UNITED STATES PATENT OFFICE.

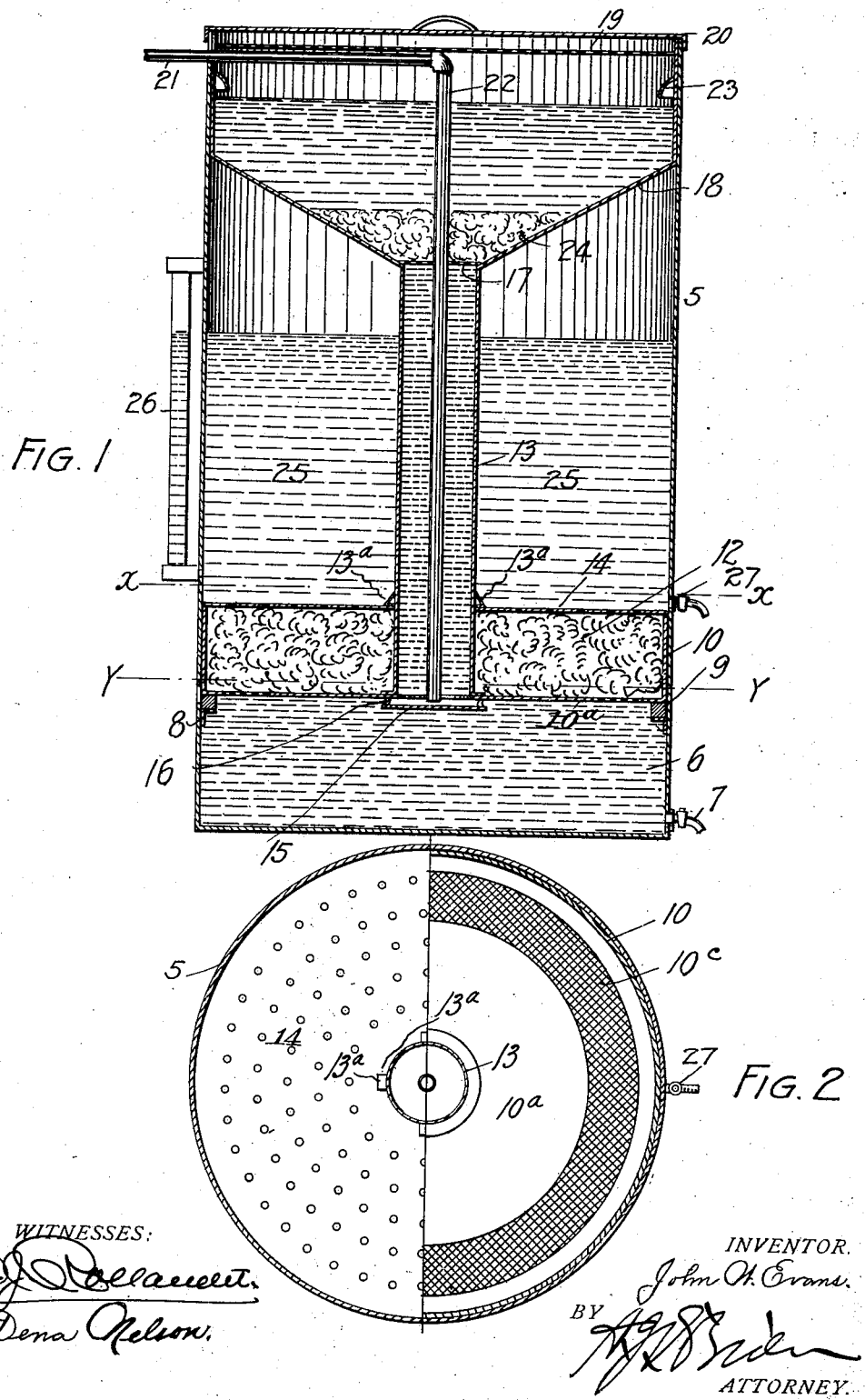

JOHN W. EVANS, OF LOS ANGELES, CALIFORNIA, ASSIGNOR OF ONE-HALF TO GEORGE A. BENWELL, JR., OF DENVER, COLORADO.

WASTE-OIL-FILTERING APPARATUS.

SPECIFICATION forming part of Letters Patent No. 700,163, dated May 13, 1902.

Application filed August 15, 1901. Serial No. 72,142. (No model.)

*To all whom it may concern:*

Be it known that I, JOHN W. EVANS, a citizen of the United States of America, residing at Los Angeles, in the county of Los Angeles and State of California, have invented certain new and useful Improvements in Waste-Oil-Filtering Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in apparatus for separating the impurities from waste lubricating-oil, whereby the oil is rendered pure and fit for use.

My object is to provide an apparatus of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

In the drawings, Figure 1 is a vertical longitudinal section taken through my improved filtering apparatus. Fig. 2 is a combined view, the left half being a section taken on the line $x\ x$, Fig. 1, and the right half a section taken on the line $y\ y$, Fig. 1.

The same reference characters indicate the same parts in both views.

Let the numeral 5 designate a casing, which is preferably cylindrical in shape. This casing is closed at the bottom and contains a quantity of water 6. This water should be supplied when the apparatus is first put in use. As the water accumulates from that which is mixed with the oil it may be drawn off from the bottom of the casing by means of a faucet 7, with which the lower part of the casing is provided. At a suitable distance above the bottom of the casing or tank the latter is provided with an interior horizontal flange 8, formed by securing a piece of angle-iron to the inside of the casing. Resting on the flange 8 is a cushion-ring 9, preferably composed of rubber. Located within the tank and resting on the ring 9 is a receptacle 10, containing suitable filtering material 12. The bottom of this receptacle is provided with a central opening, which is surrounded by the lower extremity of a stand-pipe 13, which is flanged and made fast, as by soldering, to the bottom of the filter-receptacle. Outside of the central opening the bottom $10^a$ of the receptacle is closed, except at $10^c$, which consists of an annular strainer part located near the outer wall of the receptacle. This strainer may be of any desired construction, its function being to strain the oil as it is forced up from below under the influence of the pressure of the column of liquid in the stand-pipe. Within this receptacle and surrounding the stand-pipe 13 is located the filter material, which may consist of ordinary waste or refuse cotton. On top of the filtering material is placed a perforated plate or screen 14, which is held in place by projections $13^a$ on the stand-pipe, which engage the plate from above. Suspended slightly below the central opening in the bottom 10, and consequently directly below the lower extremity of the pipe 13, is a small plate 15, which is connected with the bottom of the filter-receptacle by short hangers 16. The top of the stand-pipe is provided with a fine-screen covering 17, forming the bottom of the funnel-shaped top or receptacle 18, which is secured to the top of the pipe and fits the top of the casing closely. The top of the funnel 18 is covered by a coarse screen 19, while above this screen is located a cap or cover 20, applied to the top of the casing.

Through an opening formed in the top of the casing is introduced a horizontal pipe 21, connected at its outer extremity with a source of steam and at its inner extremity with a vertical pipe 22, which passes downward through the center of the stand-pipe 13, its lower extremity being open and located slightly above the plate 15. The function of the pipes 21 and 22 is to introduce steam into the lower part of the casing 5 for the purpose of warming the oil and maintaining it at a proper temperature to flow freely. Hence these pipes will only be needed when the temperature is normally so low as to interfere with the proper flow of the oil. Resort is then had to artificial heat through the agency of the steam-pipes. Near the top of the vertical portion of the funnel 18 are located handles 23 to facilitate the removal of the filtering apparatus from the casing as well as the replacing of the same.

In the bottom of the funnel and immediately above the screen 17 is placed a quantity 24 of waste or other suitable filtering material. Between the sloping walls of the funnel 18 and the screen 14 is the chamber 25, in which the pure or filtered oil accumulates after passing through the filtering apparatus. Upon the casing is mounted a gage-glass 26, which communicates with the chamber 25 and indicates the depth of oil therein. The oil may be drawn off from the chamber 25 by way of a faucet 27.

When the apparatus is in use, the cover 20 is removed from the casing and the waste oil to be filtered is poured upon the screen 19, whence it passes into the funnel, thence through the waste or other filtering material 24, through the fine screen 17, down through the stand-pipe, and thence out through its open lower extremity into the bottom of the casing, where it flows out on the water 6, which should be sufficient in quantity to leave only a shallow space for the oil between the water and the bottom $10^a$ of the filter-receptacle. This oil as it accumulates on top of the water is forced by the column of liquid above upward through the screen $10^c$, the filtering material 12, and the screen 14 into the chamber 25, containing the pure oil, as aforesaid. The function of the rubber ring 9 is to form a liquid-tight joint between the filter and the casing, whereby the oil is prevented from passing upwardly into the chamber 25 without passing through the filter. The gravity of the filtering apparatus within the casing acting on the cushion-ring is sufficient to produce this result.

Having thus described my invention, what I claim is—

1. In an oil-filter, the combination with an outer casing, provided with a flange surrounding the same on the inside, a suitable distance above its bottom, of a cushion supported by said flange, a receptacle resting on said cushion and comprising a bottom having a central opening, and an outer strainer portion, a stand-pipe whose lower extremity is open, said stand-pipe engaging said bottom and surrounding the central opening therein, a quantity of filtering material placed inside the receptacle, a strainer surrounding the stand-pipe and supported on the top of the receptacle, and a receptacle fitted into the upper part of the casing and communicating with the stand-pipe, the arrangement being such that a chamber for the filtered oil is left in the casing between the upper and lower receptacles.

2. The combination with an outer casing, surrounded by a flange on the inside, the flange being located a suitable distance above the bottom of the casing, of a cushion supported by said flange, a receptacle resting on said cushion and containing filtering material, a portion of the bottom of the receptacle consisting of a strainer, a strainer covering the top of the receptacle, a stand-pipe passed through the filter-receptacle said pipe being open at the bottom and communicating with the space below said receptacle, an enlargement attached to the top of the stand-pipe and fitted into the upper part of the casing, a strainer covering the top of the stand-pipe, filtering material located in the stand-pipe enlargement above the top of the stand-pipe, and a pipe communicating with the chamber in the bottom of the casing for the introduction of steam for the purpose set forth, the arrangement being such that there is a chamber for the filtered oil between the enlargement at the top of the stand-pipe and the filter surrounding its lower portion.

3. In an oil-filter, the combination with a casing, of a stand-pipe located therein, a funnel fitted into the casing and connected with the top of the stand-pipe, a filter surrounding the lower part of the stand-pipe and located a suitable distance above the bottom of the casing a plate located below the lower extremity of the stand-pipe, and suspended from the filter, a chamber for the filtered oil being left between the filter and the funnel, the arrangement being such that the oil poured into the funnel, passes downward through the stand-pipe and up through the filter in said chamber.

4. In an oil-filter, the combination with an outer casing of a cushion extending around the inside of the casing and supported thereon a suitable distance above its bottom, a filter resting on said cushion, a stand-pipe passed through the filter and communicating with the chamber below the latter, and a funnel fitted into the casing and communicating with the top of the stand-pipe, a chamber for the filtered oil being left around the stand-pipe between the funnel and the filter, the arrangement being such that the oil poured into the funnel passes through the stand-pipe into the chamber below the filter, and is forced through the filter into the chamber above, by the column of liquid in the stand-pipe, substantially as described.

5. In an oil-filter, the combination with a casing, a stand-pipe located therein and provided at the top with a funnel-shaped enlargement fitted into the casing, a filter surrounding the lower part of the stand-pipe, a chamber for the pure oil being left between the filter and the funnel, a plate attached to the filter below the lower extremity of the stand-pipe, and a steam-pipe passed through the stand-pipe and terminating a short distance above the said plate whereby the steam is deflected outwardly as it enters the chamber below the filter.

In testimony whereof I affix my signature in presence of two witnesses.

JOHN W. EVANS.

Witnesses:
L. H. WESTCOTT,
C. E. MULHOLLAND.